UNITED STATES PATENT OFFICE.

RUDOLF LINKMEYER, OF BREMEN, GERMANY.

PROCESS OF PRODUCING SOLUTIONS FOR SPINNING ARTIFICIAL THREADS AND THE LIKE.

945,559. Specification of Letters Patent. Patented Jan. 4, 1910.

No Drawing. Application filed March 8, 1909. Serial No. 482,001.

*To all whom it may concern:*

Be it known that I, RUDOLF LINKMEYER, a subject of the German Emperor, and residing at Bremen, Germany, have invented a certain new and useful Improved Process of Producing Solutions for Spinning Artificial Threads and the Like, of which the following is a specification.

The subject-matter of my invention is an improved process of producing durable solutions for spinning artificial threads and the like.

It has been found that cupro-ammonium cellulose solutions, which on account of their sensitiveness to heat can only be produced and preserved at a low temperature, acquire a high degree of permanence when other carbo-hydrates are incorporated in them. They then stand a temperature of 30° to 40° C. without injury and consequently can be preserved without being cooled. In addition, the products produced are exceedingly waterproof and elastic. Further, fine threads obtained therefrom do not adhere together and have an excellent silky gloss.

My invention consists in mixing carbo-hydrates with cupro-ammonium cellulose solutions obtained in the usual manner.

The solutions obtained are very simply worked up, for the structures formed from them become, strange to say, perfectly transparent when the ammonia simply evaporates in the air and they maintain this valuable property during all the subsequent operations. Similar structures could be obtained heretofore from pure cupro-ammonium cellulose solutions only by coagulation by means of alkalies, but the products obtainable according to my invention are superior to these also in strength and elasticity. Moreover they can be dried, without previously removing the copper, without their transparency being impaired, whereas the products obtained in known manner from pure cellulose solutions would, under like conditions, form non-transparent, brittle masses. This circumstance is of considerable importance; as the manufacture of artificial threads, for example, requires after the spinning operation a series of operations, which heretofore had to be performed directly after the spinning, and consequently under conditions when the threads are particularly sensitive. If one proceeds according to the present new process, on the contrary, it is quite possible to work up the crude threads before or after the first drying process; for, as follows from the above, these threads are very particularly suitable for being worked up after being dried in consequence of their tensile strength and elasticity.

Most of the carbo-hydrates can be employed in my new process. Very good results are obtained with hexoses di-saccharids or polysaccharids by employing them in proportions of about 25% by weight of the cellulose.

Example: A cupro-ammonium cellulose solution having 7% cellulose is prepared in a kneading-machine in one of the known ways, a small quantity of glycerin, one half to one per cent. of the weight of the cellulose being mixed with the ammonia for the purpose of increasing the solubility of the cupric hydrate. No more ammonia, *i. e.* pure $NH_3$, is then necessary than is equal to the weight of the cellulose. Potato syrup, glucose, to the amount of about 35% of the weight of the cellulose is added gradually to the solution, which is obtained in a short time without any cooling, whereupon the whole mass is kneaded for some time longer. The mass is then ready for use.

If importance is attached to it, before working it up into threads and the like, a considerable quantity of ammonia may be removed from the mass by simply heating it without any precipitation having to be feared. While the ammonia is caused to evaporate, the solution behaves quite differently from pure cupro-ammonium cellulose solution which, as soon as its percentage of ammonia begins to fall below 70 grams per liter, is no longer able to keep in solution the entire quantity of cellulose and as the ammonia continues to escape is converted into a rigid, brittle and non-transparent, ultramarine blue mass. In contradistinction to this, under like conditions solid precipitates are not precipitated at all from the new solutions; on the contrary the masses remain until the last homogeneous solutions, which only increase in toughness in the mass as ammonia is evaporated from them. When the ammonia has entirely escaped caoutchouc-like, but perfectly transparent products remain behind which, when dried, finally harden but keep their transparency. Having regard to their behavior when the ammonia contained in them is caused to evaporate, these new solutions are particularly suitable for many kinds of useful purposes, since they can be coagulated after being shaped in a simple manner without any further means. They may, however, also be coagulated by means of the usual coagulation baths such as are used for pure cellulose solutions.

I claim:—

1. The process of producing durable solutions for spinning artificial threads and the like, which comprises mixing a sugar with cupro-ammonium cellulose, and retaining the sugar in the solution without effecting the reduction of the cupric-hydrate of the cupro-ammonium cellulose-solution thereby avoiding the necessity of treatment with alkali.

2. The process of producing durable solutions for spinning artificial threads, which comprises adding to a cupro-ammonium solution about 35% by weight of its cellulose content, of sugar and retaining the sugar in the solution without effecting the reduction of the cupric-hydrate of the cupro-ammonium cellulose-solution.

In testimony whereof, I affix my signature in the presence of two witnesses.

RUDOLF LINKMEYER.

Witnesses:
MARIE MAHNKEN,
FERDINAND REICH.